United States Patent Office 3,481,084
Patented Dec. 2, 1969

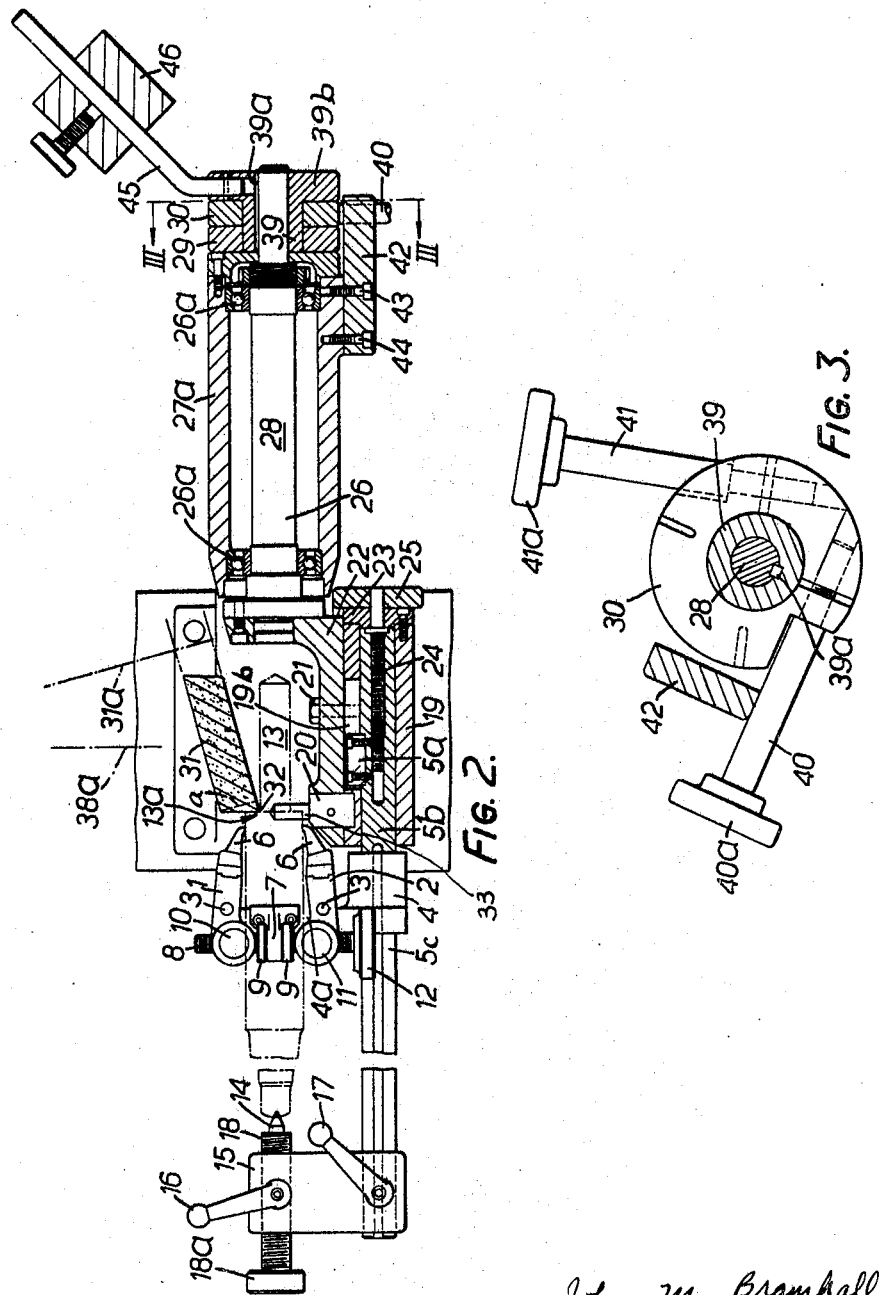

3,481,084
MACHINES FOR GRINDING TWIST DRILLS
John Michael Bramhall, Grindleford, Derby, England, assignor to The Sheffield Twist Drill & Steel Co. Limited
Filed Jan. 16, 1967, Ser. No. 609,613
Claims priority, application Great Britain, Jan. 26, 1966, 3,497/66
Int. Cl. B24b *3/24, 5/00, 19/00*
U.S. Cl. 51—91           8 Claims

ABSTRACT OF THE DISCLOSURE

Apparatus for grinding the step point of a multi-diameter twist drill, including a drill holding assembly for moving the step point into engagement with an independently mounted grinding wheel, and compound slide assembly means supporting said drill holding assembly for rotation about an axis at right angles to said rotatable shaft, whereby the position of the drill holding assembly and the drill may be adjusted relative to the grinding wheel. The drill holding assembly includes a rotatable shaft, a support bracket mounted on said shaft, a carrier block pivotally connected with said support bracket, carriage means slidably connected with said carrier block, and drill clamping means slidably mounted on said carriage.

---

Figure 1:
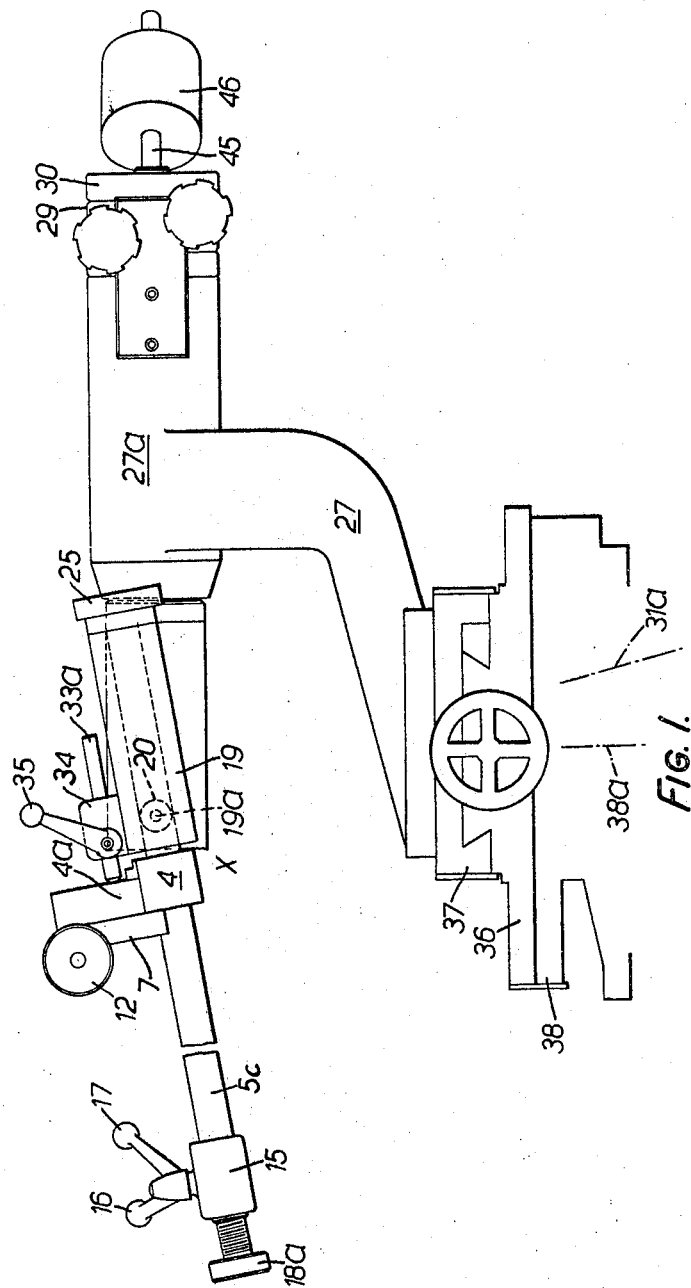

This invention relates to a machine for grinding twist drills and is designed especially for grinding the secondary or step point of multi-diameter drills such as subland and other multi-diameter drills.

The step point of a multi-diameter drill must have substantially the same geometry as the primary point of the drill. Hitherto this has been extremely difficult to achieve due to complications arising from the fact that the grinding wheel must generate a radius at its outer edge similar to the radius of the step point. Furthermore with a subland drill which has four, or even six, flutes as compared with the conventional two flutes of other multi-diameter drills, the grinding wheel must be capable of generating the required amount of lip clearance without damaging the land of the next flute in rotation, that is the grinding wheel must be withdrawn as soon as the required amount of lip clearance has been generated and before it has a chance to contact the land of the next flute. In view of the complexities involved, the accepted method of grinding the step point of a subland drill has been to grind a narrow margin along the cutting lip of the step point, with a constant clearance angle, with a conventional tool and cutter grinder and then to produce a secondary clearance, usually by hand, on an off hand grinder. This method is by no means ideal and calls for considerable skill by the operator, and the object of the present invention is to provide a grinding machine of relatively simple construction by means of which the step point of multi-diameter drills can be mechanically ground geometrically correct by semi-skilled or even unskilled operators.

With this object in view the drill grinding machine according to the invention comprises a drill holding assembly movable to move the step point of the drill into engagement with an independently mounted driven grinding wheel, said drill holding assembly including a support bracket mounted on a rotatable shaft and pivotable about the axis of said shaft, a carriage slidably adjustable on said support bracket in a direction parallel to said shaft and pivotable on said support bracket in a plane parallel with the axis of said shaft, a drill clamping means slidably mounted on said carriage and holding said drill with the drill axis in the same plane as the plane containing the shaft axis, means for axially adjusting the drill in said drill clamping means relative to the grinding wheel, said drill holding assembly being mounted on a compound slide assembly rotatable about an axis at right angles to said rotatable shaft for adjusting the position of said drill holding assembly and said drill relative to the grinding wheel.

In order that the invention may be more clearly understood one particular embodiment of grinding machine according to the invention will now be described, by way of example, with reference to the accompanying drawings in which:

FIGURE 1 is a side elevation of the machine,
FIGURE 2 is a plan view of the machine with parts shown in axial cross-section, and
FIGURE 3 is a section on the line III—III of FIGURE 2.

Referring to these drawings the machine according to the invention comprises generally a drill holding assembly movable mounted to move the step point 13a of a twist drill 13 into engagement with an independently mounted driven grinding wheel 31, said drill holding assembly including a support bracket 22 mounted on one end of a manually rotatable horizontal shaft 26 and pivotable about the axis 28 of said shaft; a carriage means 5a, 5b, 5c including a carriage portion 5b slidably adjustable in a carrier block 19 on said support bracket 22 in a direction parallel to said shaft 26 and pivotally mounted about a horizontal axis 19a on said support bracket so as to be pivotable in a vertical plane parallel with said shaft 26; a drill clamping means 1–4 slidably mounted on a slide bar portion of said carriage means and arranged to hold said drill 13 with its axis in the same vertical plane as that containing the shaft axis; means 14–18 for axially adjusting said drill in said clamping means relative to the grinding wheel 31; said drill holding assembly being mounted by means of an arm 27 on a compound slide assembly 36, 37, 38 rotatable about a vertical axis 38a for adjusting said drill holding assembly and the step point 13a of the drill carried thereby relative to the periphery of the grinding wheel.

The drill clamping means comprises a drill clamp having two clamping arms 1 and 2 pivotable about trunions 3 mounted in a block 4 which is slidably mounted on the slide bar portion 5c of said carriage means. The arms 1 and 2 are each provided with an interchangeable jaw 6 provided with a suitably shaped groove so arranged that the jaw engages on both margins of a flute of the drill 13. The jaws 6 serve the dual purpose of clamping and supporting the drill in position for grinding and accurately positioning the drill to present the step point in correct rotary alignment to the grinding wheel 31.

Mounted on an extension 4a of the block 4 is a bracket 7 through which passes a screw 8 which is positioned relative to bracket 7 by means of two lock nuts 9. The screw 8 is provided at one end with left hand screw threads which engage internal screw threads in a bush 10 and at the other end with right hand screw threads which engage internal screw threads in a bush 11. The internally screw threaded bushes 10 and 11 are rotatably mounted in the ends of clamping arms 1 and 2 respectively. On one end of the screw 8 is a hand wheel 12 rotation of which causes the arms 1 and 2 to pivot about trunions 3 to cause the clamping jaws 6 to move towards or away from the drill axis depending upon the direction of rotation.

The drill 13 is additionally supported at its outer end by means of a tailstock centre 14 which is mounted in an axial bore of an externally screw threaded member 18 rotatably mounted in an internally screw threaded bore in a tailstock block 15 slidably mounted on the carriage slide bar portion 5c. The tailstock centre 14 is axially adjustable by a rotating member 18 by means of a hand wheel 18a and can be locked in any axially adjusted position by a hand operated locking means 16. The complete tailstock assembly is slidable along the carriage slide bar portion 5c to accommodate drills of different lengths and can be locked in any adjusted position by means of a hand operated locking means 17.

The carriage 5, 5b is slidably mounted in a carrier block 19 that is pivotally connected with support bracket 22 for pivotal movement about trunnion 20. In this manner, the position of the drill 13 may be adjusted relative to the grinding wheel 31 to produce the required clearance on the flank of the step point 13a of the drill. Following adjustment, the carrier is locked in place by means of the set screw 21 that extends downwardly from support bracket 22 into the slot 19b contained in carrier block 19. The carrier block 19 is provided with an end cap 23 in which is mounted an adjustment screw 24 which engages in an internally screw threaded bore in part 5b of the carriage whereby said carriage can be linearly adjusted in a plane parallel to shaft 26 by rotation of a hand wheel 25.

The bracket 22 is fixedly mounted on one end of the shaft 26 which is rotatably mounted in suitable bearings 26a in a cylindrical housing 27a, whereby the whole of the drill holding assembly can be rotated about the axis 28 of the shaft 26. The arrangement of the various component parts of the drill holding assembly is such that the axis of the drill 13 is always in the same vertical plane as the axis 28 of the shaft 26. Thus pivotal movement of the drill holding assembly about axis 28 will result in the drill being rotated about its own axis and move laterally towards the grinding wheel 31 whose axis of rotation 31a is at an angle to the axis 28 of shaft 26. In order to obtain the desired clearance angle adjacent to the cutting lip of the step point 13a of the drill 13 the carrier block 19 is pivotable about an axis 19a (FIGURE 1). The shaft 26 is provided with two adjustable stop elements 29 and 30 arranged so as to limit the rotary movement of the shaft to prevent the danger of the grinding wheel 31 catching a flute of the drill. The stop elements 29 and 30 are in the form of split rings clamped to a sleeve 39 keyed to the outer end of shaft 26 by a key 39a. The split rings 29 and 30 are clamped to said sleeve 39 by screw members 40 and 41 (see FIGURE 3) operated by handles 40a and 41a respectively which are mounted on the outer end of elongated outwardly projecting shank portions of said screws and which limit rotary movement of shaft 26 by engagement with an abutment block 42 bolted to cylindrical housing 27 by bolts 43, 44. The shank portions of the screw members 40 and 41 are arranged at an angle to each other (as shown in FIGURE 3) in such a manner that stop element 30, 40, limits clockwise rotation of the shaft 26 whilst stop element 29, 41 limits anti-clockwise rotation of said shaft. The sleeve 39 is provided at its outer end with a radial flange 39b which prevents axial displacement of the stop elements and also serves to carry a counterweight bar 45 and counterweight 46.

Referring now to FIGURE 1, the drill holding assembly including shaft assembly 26, 27a, are mounted on arm 27 which at one end is integral with the shaft housing 27a and at the other end is secured to a compound slide assembly comprising a slide 36 slidable on a supporting base 38 in a plane parallel to the axis of shaft 26 and a slide 37 slidable on slide 36 in a plane at right angles to said axis. Screw adjustment means (not shown) are provided for adjusting the position of the slides 36 and 37 relative to each other and the supporting base 38 is in the form of a turntable by means of which the compound slide assembly can be rotated about an axis 38a at an angle to the grinding wheel axis 31a to set the machine to produce the required drill point angle.

The grinding wheel 31 is mounted and driven at a suitable peripheral speed in any known manner and by any known means (not shown) and has its periphery dressed at a fixed angle a which is correlated with a scale (not shown) provided on the turnable 38. In addition the edge 32 of the grinding wheel is dressed with a chamfer to avoid the danger of under-cutting the blend between the step diameter and the step point of the drill. The chamfer must always be in a plane parallel to the drill axis and to produce such chamfer there is provided a diamond cutter 33 which also serves as datum. The diameter cutter 33 is mounted in trunnion 20 is moved into contact with the extreme peripheral edge 32 of the grinding wheel by suitable adjustment of the slide 36 of the slide assembly 36, 37, 38 to bring the intersection of the shaft axis 28 and the drill axis into the correct position relative to the grinding wheel. The slide 36 is then locked in its adjusted position and the machine is set already for operation. With the machine thus set the operator, to grind the step point of the drill, merely has to move the step diameter into contact with the chamfered portion of the grinding wheel by adjusting slide 37 and simultaneously advancing carriage means, by means of the hand wheel 25, and oscillate the drill holding assembly about axis 28 between the previously positioned stops 29 and 30 to grind the step point. When the desired amount of metal has been removed from the first flank of the step point of the drill, a slidably adjustable stop 33a (FIGURE 1) which is slidably mounted in a block 34 mounted on the carrier block 19, is moved manually into contact with the extension 4a of block 4 carrying the clamping jaws 6 and locked in position by a manually operated locking device 35. The carriage means is then retracter, the drill re-indexed in the drill clamping jaws 6 and the next flank of the step point of the drill ground by advancing carriage means until the extension 4a of block 4 abuts the stop 33a, thus ensuring identical amounts of metal are removed from each of the flanks of the step point of the drill.

It will be understood that the grinding machine according to the invention once set and adjusted, as above described, for grinding the step point angle of a particular drill, all types and diameters of multi-diameter and multi-flute drills can be correctly re-sharpened at the adjusted setting of the machine irrespective of variables such as step diameter to body diameter ratio, overall length, etc.

What is claimed is:

1. Grinding apparatus including a rotary grinding wheel for grinding a step point of a multi-diameter twist drill, comprising drill holding means for moving the drill step point into engagement with the grinding wheel, said drill holding means including a rotatably mounted shaft, a support bracket secured to one end of said shaft, carrier block means connected with said support bracket for pivotal movement about an axis normal to the shaft axis, carriage means connected with said carrier block means for axial sliding movement in a plane parallel with the shaft axis, drill clamping means slidably connected for longitudinal movement relative to said carriage means, and means for axially adjusting the drill in said clamping means relative to the grinding wheel;

and rotatable means supporting said drill holding means for rotation about an axis at right angles to the axis of said shaft, whereby the position of the drill holding means and said drill may be adjusted relative to the grinding wheel.

2. Apparatus as defined in claim 1 wherein said rotatable drill holding support means comprises a plurality of orthogonally-arranged slide members.

3. Apparatus as defined in claim 1, wherein said carriage means includes a carriage member having carriage and slide bar portions, said carriage portion being slidably mounted in said carrier block; and adjustment screw means for axially adjusting said carriage means relative to said carrier block;

said means for axially adjusting the drill in said clamping means including a tailstock slidably mounted on said slide bar portion, said drill clamping means being slidably mounted on said slide bar portion between said tailstock and said carrier block.

4. Apparatus as defined in claim 3, and further including means rotatably supporting said shaft, comprising a cylindrical housing, and bearing means mounted in said housing, and further including adjustable stop means for limiting rotary movement of said shaft.

5. Apparatus as defined in claim 4, wherein said adjustable stop means comprises a pair of split rings clamped to said shaft and carrying angularly-spaced radially-extending projections, and an abutment on said cylindrical housing arranged for engagement by said projections, said projections being arranged to limit the clockwise and counterclockwise extent of rotation of said shaft, respectively.

6. Apparatus as defined in claim 5, wherein the axis of said shaft is arranged at an angle to the axis of said grinding wheel.

7. Apparatus as defined in claim 6, and further including diamond cutter means carried by said support bracket for engagement with the grinding wheel prior to the drill grinding operation, whereby a chamfer is produced on said grinding wheel.

8. Apparatus as defined in claim 7, and further including adjustable stop means carried by said support bracket for engagement with said drill clamping means after one flank of the drill has been ground before re-indexing the drill to grind the other flank, thereby to ensure identical grinding of each flank of said drill.

References Cited

UNITED STATES PATENTS

| 1,020,860 | 3/1912 | Vauclain | 51—219 |
| 2,371,676 | 3/1945 | Coyne | 51—219 |

LESTER M. SWINGLE, Primary Examiner

U.S. Cl. X.R.

51—219